US012676724B2

(12) United States Patent
Xie et al.

(10) Patent No.: US 12,676,724 B2
(45) Date of Patent: Jul. 7, 2026

(54) RECEIVING/SENDING SWITCHING CONTROL METHOD, MANAGEMENT NODE, AND TERMINAL NODE

(71) Applicant: Huawei Technologies Co., Ltd., Shenzhen (CN)

(72) Inventors: Zichen Xie, Shanghai (CN); Rong Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 346 days.

(21) Appl. No.: 18/581,473

(22) Filed: Feb. 20, 2024

(65) Prior Publication Data

US 2024/0195584 A1 Jun. 13, 2024

Related U.S. Application Data

(63) Continuation of application No. PCT/CN2021/113857, filed on Aug. 20, 2021.

(51) Int. Cl.
*H04L 5/00* (2006.01)
*H04W 28/18* (2009.01)

(52) U.S. Cl.
CPC ........... *H04L 5/0055* (2013.01); *H04W 28/18* (2013.01)

(58) Field of Classification Search
CPC ............................ H04L 5/0055; H04W 28/18
See application file for complete search history.

(56) References Cited

U.S. PATENT DOCUMENTS

| | | |
|---|---|---|
| 2015/0289283 A1 | 10/2015 | Ko et al. |
| 2016/0338081 A1* | 11/2016 | Jiang ..................... H04L 5/0055 |
| 2021/0119726 A1* | 4/2021 | Kim ..................... H04B 7/0404 |

FOREIGN PATENT DOCUMENTS

WO 2016175684 A1 11/2016

* cited by examiner

*Primary Examiner* — Michael Thier
*Assistant Examiner* — Tracy Lauren Raimondo
(74) *Attorney, Agent, or Firm* — Conley Rose, P.C.

(57) ABSTRACT

A method and associated apparatus provide for a management node to send to a terminal node, a negotiation request used to update a receiving/sending switching interval to first switching time. The receiving/sending switching interval includes a first receiving/sending switching interval of the management node and a second receiving/sending switching interval of the terminal node. The terminal node receives the negotiation request, feeds back acknowledgment response information to the management node in response to the negotiation request, and updates the second receiving/sending switching interval to the first switching time. The management node receives the acknowledgment response information. The management node updates the first receiving/sending switching interval to the first switching time based on the acknowledgment response information.

20 Claims, 7 Drawing Sheets

G > T: A node G sends a
data packet to a node T
T > G: The node T sends a
data packet to the node G G > T: A node G sends a
data packet to a node T
T > G: The node T sends a
data packet to the node G

RECEIVING/SENDING SWITCHING CONTROL METHOD, MANAGEMENT NODE, AND TERMINAL NODE

CROSS-REFERENCE TO RELATED APPLICATIONS

This is a continuation of International Patent Application No. PCT/CN2021/113857 filed on Aug. 20, 2021, the disclosure of which is hereby incorporated by reference in its entirety.

TECHNICAL FIELD

This disclosure relates to the communication field, and in particular, to a receiving/sending switching control method, a management node, and a terminal node.

BACKGROUND

A receiving/sending switching interval is time needed by a communication apparatus to perform receiving/sending switching, and is specifically a time interval between an end moment of a former process and a start moment of a latter process in a data sending process and a data receiving process that are adjacent. In the receiving/sending switching interval, the communication apparatus may perform a preparation process of switching from a sending state to a receiving state, or perform a preparation process of switching from a receiving state to a sending state.

According to a current BLUETOOTH standard, the receiving/sending switching interval is fixed. Therefore, when a BLUETOOTH communication manner is used for communication, after each data sending process or data receiving process ends, a short-range wireless communication apparatus needs to start, after a fixed receiving/sending switching interval, performing an operation corresponding to a state that is switched to.

In the foregoing solution, in all scenarios, the short-range wireless communication apparatus can configure data receiving and sending time points based only on the fixed receiving/sending switching interval, causing a problem of inflexible receiving/sending switching. In addition, even if the receiving/sending switching interval is unnecessary, fixed time needs to be reserved for performing receiving/sending switching, causing unnecessary resource occupation and reducing a resource utilization rate.

SUMMARY

This disclosure provides a receiving/sending switching control method, a management node, and a terminal node, to improve flexibility of receiving/sending switching control, and improve a resource utilization rate in a receiving/sending switching process.

According to a first aspect, this disclosure provides a receiving/sending switching control method, including a management node which sends, to a terminal node, a negotiation request used to update a receiving/sending switching interval to first switching time. The receiving/sending switching interval includes a first receiving/sending switching interval of the management node and a second receiving/sending switching interval of the terminal node. The management node receives acknowledgment response information fed back by the terminal node in response to the negotiation request. The management node updates the first receiving/sending switching interval of the management node to the first switching time based on the acknowledgment response information.

In the method, in a process of communicating with the terminal node, the management node can adjust and update the receiving/sending switching interval based on which receiving/sending switching control is performed, and indicate an updated receiving/sending switching interval to the terminal node, so that the terminal node can also perform same update as the management node. Based on the method, the management node and the terminal node may control a receiving/sending switching process in a communication process based on different receiving/sending switching intervals. This improves flexibility of the receiving/sending switching control. In addition, the management node and the terminal node may support flexible adjustment of the receiving/sending switching interval, so that corresponding receiving/sending switching control can adapt to service requirements in a plurality of different scenarios. This further improves a resource utilization rate in the receiving/sending switching process and implements appropriate and effective utilization of resources.

In a possible design, that the management node updates the first receiving/sending switching interval of the management node to the first switching time based on the acknowledgment response information. The management node sends indication information to the terminal node. The indication information indicates an effective time for updating the receiving/sending switching interval. The management node updates the first receiving/sending switching interval to the first switching time after the effective time.

In the method, the management node can determine, based on the acknowledgment response information, whether the terminal node receives the updated receiving/sending switching interval (that is, the first switching time), to ensure information synchronization between the two nodes, facilitate performing a subsequent processing process, and ensure accuracy of the processing process. The management node indicates, by indicating the effective time, the terminal node to update the receiving/sending switching interval at the effective time. In addition, the management node also updates the receiving/sending switching interval at the effective time. This can ensure synchronization and accuracy of updating the receiving/sending switching interval by the two nodes, and further improve synchronization and accuracy of performing receiving/sending switching control by the two nodes.

In a possible design, the management node updates the first receiving/sending switching interval of the management node to the first switching time based on the acknowledgment response information. The management node sends acknowledgment information to the terminal node, to indicate the terminal node to update the second receiving/sending switching interval of the terminal node to the first switching time. The management node updates the first receiving/sending switching interval to the first switching time.

In the method, the management node may further acknowledge, by sending the acknowledgment information to the terminal node, that the receiving/sending switching interval is to be updated. After sending the acknowledgment information, the management node updates the receiving/sending switching interval immediately, so that the terminal node can also update the receiving/sending switching interval immediately after receiving the acknowledgment information. This quickly implements update of the receiving/sending switching interval by the management node and the terminal node.

In a possible design, after that the management node sends the acknowledgment information to the terminal node, and before that the management node updates the first receiving/sending switching interval to the first switching time, the management node monitors and receives a first data packet from the terminal node in a specified receiving window after target switching time. A value of the target switching time is a value of the smaller one of the first receiving/sending switching interval that is not updated and the first switching time. The management node determines, based on a receiving moment of the first data packet, that the terminal node receives the acknowledgment information.

In the method, regardless of whether the terminal node updates the receiving/sending switching interval, the management node may receive a data packet from the terminal node, and after determining based on the data packet that the management node has updated the receiving/sending switching interval, the management node may perform receiving/sending switching control by using the updated receiving/sending switching interval. Therefore, a case in which receiving/sending switching intervals used by the two nodes are inconsistent can be avoided. This further ensures consistency and accuracy of performing receiving/sending switching control by the two nodes.

In a possible design, the management node determines, based on a receiving moment of the first data packet, that the terminal node receives the acknowledgment information. When determining that the receiving moment is consistent with a target receiving moment, the management node determines that the terminal node receives the acknowledgment information. The target receiving moment is a receiving moment that is calculated by the management node and that corresponds to the first data packet when the first receiving/sending switching interval is the first switching time.

In the method, the management node may determine, based on the receiving moment of the data packet from the terminal node, the receiving/sending switching interval used by the terminal node, to determine whether the terminal node has successfully updated the receiving/sending switching interval, and may switch to the updated receiving/sending switching interval to perform receiving/sending switching control after determining that the terminal node has updated the receiving/sending switching interval.

In a possible design, a size of the specified receiving window is greater than or equal to a sum of a first target value and a second target value, a value of the first target value is a size value of a corresponding receiving window in which the management node monitors a second data packet from the terminal node before the management node updates the first receiving/sending switching interval to the first switching time, and a value of the second target value is a value of a difference between the first receiving/sending switching interval that is not updated and an updated first receiving/sending switching interval.

In the method, in a process in which the management node monitors the data packet from the terminal node, the size of the receiving window is increased to ensure that the management node can receive the data packet from the terminal node regardless of whether the terminal node has updated the receiving/sending switching interval of the terminal node. Therefore, a problem of a data packet receiving/sending failure can be avoided.

In a possible design, any receiving/sending switching interval includes at least one of an intra-frame space and a minimum subevent space.

According to a second aspect, this disclosure provides a receiving/sending switching control method in which a terminal node receives a negotiation request that is sent by a management node and that is used to update a receiving/sending switching interval to first switching time. The receiving/sending switching interval includes a first receiving/sending switching interval of the management node and a second receiving/sending switching interval of the terminal node. The terminal node updates the second receiving/sending switching interval of the terminal node to the first switching time in response to the negotiation request.

In the method, in a process of communicating with the management node, the terminal node can adjust and update, based on an updated receiving/sending switching interval from the management node, the receiving/sending switching interval based on which receiving/sending switching control is performed. Based on the method, the terminal node and the management node may control a receiving/sending switching process based on different receiving/sending switching intervals. This improves flexibility of the receiving/sending switching control. In addition, the terminal node and the management node may support flexible adjustment of the receiving/sending switching interval, so that corresponding receiving/sending switching control can adapt to service requirements in a plurality of different scenarios. This further improves a resource utilization rate in the receiving/sending switching process and implements appropriate and effective utilization of resources.

In a possible design, the terminal node updates the second receiving/sending switching interval of the terminal node to the first switching time in response to the negotiation request. The terminal node feeds back acknowledgment response information to the management node in response to the negotiation request. The terminal node receives indication information delivered by the management node in response to the acknowledgment response information. The indication information indicates an effective time for updating the receiving/sending switching interval. The terminal node updates the second receiving/sending switching interval to the first switching time after the effective time.

In the method, the terminal node sends the acknowledgment response information to the management node, to ensure that the management node can determine whether the terminal node receives the updated receiving/sending switching interval, and to ensure information synchronization between the two nodes, facilitate performing a subsequent processing process, and ensure accuracy of the processing process. The terminal node updates the receiving/sending switching interval at the effective time based on the indication of the management node. This can ensure synchronization and accuracy of updating the receiving/sending switching interval by the terminal node and the management node, and further improve synchronization and accuracy of performing receiving/sending switching control by the two nodes.

In a possible design, the terminal node updates the second receiving/sending switching interval of the terminal node to the first switching time in response to the negotiation request. The terminal node feeds back acknowledgment response information to the management node in response to the negotiation request. The terminal node receives acknowledgment information delivered by the management node in response to the acknowledgment response information. The acknowledgment information indicates the terminal node to update the second receiving/sending switching interval to the first switching time. The terminal node updates the second receiving/sending switching interval to the first switching time.

In the method, the terminal node may further acknowledge, based on the acknowledgment information from the management node, that the receiving/sending switching interval may be updated, and then update the receiving/sending switching interval, to avoid as much as possible a case in which receiving/sending switching intervals used by the two nodes are inconsistent. This further ensures consistency and accuracy of performing receiving/sending switching control by the two nodes.

In a possible design, any receiving/sending switching interval includes at least one of an intra-frame space and a minimum subevent space.

According to a third aspect, this disclosure provides a management node, including a transceiver module and a processing module. The transceiver module is configured to send, to a terminal node, a negotiation request used to update a receiving/sending switching interval to first switching time, where the receiving/sending switching interval includes a first receiving/sending switching interval of the management node and a second receiving/sending switching interval of the terminal node and receive acknowledgment response information fed back by the terminal node in response to the negotiation request. The processing module is configured to update the first receiving/sending switching interval of the management node to the first switching time based on the acknowledgment response information.

In a possible design, when the processing module updates the first receiving/sending switching interval of the management node to the first switching time based on the acknowledgment response information, the processing module is configured to send indication information to the terminal node by using the transceiver module, where the indication information indicates an effective time for updating the receiving/sending switching interval, and update the first receiving/sending switching interval to the first switching time after the effective time.

In a possible design, when updating the first receiving/sending switching interval of the management node to the first switching time based on the acknowledgment response information, the processing module is configured to send acknowledgment information to the terminal node by using the transceiver module, to indicate the terminal node to update the second receiving/sending switching interval of the terminal node to the first switching time, and update the first receiving/sending switching interval to the first switching time.

In a possible design, after the processing module sends the acknowledgment information to the terminal node by using the transceiver module, and before the processing module updates the first receiving/sending switching interval to the first switching time, the processing module is further configured to monitor and receive, by using the transceiver module, a first data packet from the terminal node in a specified receiving window after target switching time, where a value of the target switching time is a value of the smaller one of the first receiving/sending switching interval that is not updated and the first switching time, and determine, based on a receiving moment of the first data packet, that the terminal node receives the acknowledgment information.

In a possible design, when determining, based on the receiving moment of the first data packet, that the terminal node receives the acknowledgment information, the processing module is configured to, when determining that the receiving moment is consistent with a target receiving moment, determine that the terminal node receives the acknowledgment information. The target receiving moment is a receiving moment that is calculated by the management node and that corresponds to the first data packet when the first receiving/sending switching interval is the first switching time.

In a possible design, a size of the specified receiving window is greater than or equal to a sum of a first target value and a second target value, a value of the first target value is a size value of a corresponding receiving window in which the management node monitors a second data packet from the terminal node before the management node updates the first receiving/sending switching interval to the first switching time, and a value of the second target value is a value of a difference between the first receiving/sending switching interval that is not updated and an updated first receiving/sending switching interval.

In a possible design, any receiving/sending switching interval includes at least one of an intra-frame space and a minimum subevent space.

According to a fourth aspect, this disclosure provides a terminal node, including a transceiver module and a processing module. The transceiver module is configured to receive a negotiation request that is sent by a management node and that is used to update a receiving/sending switching interval to first switching time. The receiving/sending switching interval includes a first receiving/sending switching interval of the management node and a second receiving/sending switching interval of the terminal node. The processing module is configured to update the second receiving/sending switching interval of the terminal node to the first switching time in response to the negotiation request.

In a possible design, when updating the second receiving/sending switching interval of the terminal node to the first switching time in response to the negotiation request, the processing module is configured to feed back acknowledgment response information to the management node by using the transceiver module in response to the negotiation request, receive by using the transceiver module, indication information delivered by the management node in response to the acknowledgment response information, where the indication information indicates an effective time for updating the receiving/sending switching interval, and update the second receiving/sending switching interval to the first switching time after the effective time.

In a possible design, when updating the second receiving/sending switching interval of the terminal node to the first switching time in response to the negotiation request, the processing module is configured to feed back acknowledgment response information to the management node by using the transceiver module in response to the negotiation request, receive, by using the transceiver module, acknowledgment information delivered by the management node in response to the acknowledgment response information, where the acknowledgment information indicates the terminal node to update the second receiving/sending switching interval to the first switching time, and update the second receiving/sending switching interval to the first switching time.

In a possible design, any receiving/sending switching interval includes at least one of an intra-frame space and a minimum subevent space.

According to a fifth aspect, this disclosure provides a management node, including a transceiver and a processor. The transceiver is configured to send, to a terminal node, a negotiation request used to update a receiving/sending switching interval to first switching time, where the receiving/sending switching interval includes a first receiving/sending switching interval of the management node and a second receiving/sending switching interval of the terminal node, and receive acknowledgment response information fed back by the terminal node in response to the negotiation request. The processor is configured to update the first receiving/sending switching interval of the management node to the first switching time based on the acknowledgment response information.

In a possible design, when updating the first receiving/sending switching interval of the management node to the first switching time based on the acknowledgment response information, the processor is configured to send indication information to the terminal node by using the transceiver, where the indication information indicates an effective time for updating the receiving/sending switching interval, and update the first receiving/sending switching interval to the first switching time after the effective time.

In a possible design, when updating the first receiving/sending switching interval of the management node to the first switching time based on the acknowledgment response information, the processor is configured to send acknowledgment information to the terminal node by using the transceiver, to indicate the terminal node to update the second receiving/sending switching interval of the terminal node to the first switching time, and update the first receiving/sending switching interval to the first switching time.

In a possible design, after the processor sends the acknowledgment information to the terminal node by using the transceiver, and before the processor updates the first receiving/sending switching interval to the first switching time, the processor is further configured to monitor and receive, by using the transceiver, a first data packet from the terminal node in a specified receiving window after target switching time, where a value of the target switching time is a value of the smaller one of the first receiving/sending switching interval that is not updated and the first switching time, and determine, based on a receiving moment of the first data packet, that the terminal node receives the acknowledgment information.

In a possible design, when determining, based on the receiving moment of the first data packet, that the terminal node receives the acknowledgment information, the processor is configured to when determining that the receiving moment is consistent with a target receiving moment, determine that the terminal node receives the acknowledgment information. The target receiving moment is a receiving moment that is calculated by the management node and that corresponds to the first data packet when the first receiving/sending switching interval is the first switching time.

In a possible design, a size of the specified receiving window is greater than or equal to a sum of a first target value and a second target value, a value of the first target value is a size value of a corresponding receiving window in which the management node monitors a second data packet from the terminal node before the management node updates the first receiving/sending switching interval to the first switching time, and a value of the second target value is a value of a difference between the first receiving/sending switching interval that is not updated and an updated first receiving/sending switching interval.

In a possible design, any receiving/sending switching interval includes at least one of the following an intra-frame space and a minimum subevent space.

According to a sixth aspect, this disclosure provides a terminal node, including a transceiver and a processor. The transceiver is configured to receive a negotiation request that is sent by a management node and that is used to update a receiving/sending switching interval to first switching time. The receiving/sending switching interval includes a first receiving/sending switching interval of the management node and a second receiving/sending switching interval of the terminal node. The processor is configured to update the second receiving/sending switching interval of the terminal node to the first switching time in response to the negotiation request.

In a possible design, when updating the second receiving/sending switching interval of the terminal node to the first switching time in response to the negotiation request, the processor is configured to feed back acknowledgment response information to the management node by using the transceiver in response to the negotiation request, receive, by using the transceiver, indication information delivered by the management node in response to the acknowledgment response information, where the indication information indicates an effective time for updating the receiving/sending switching interval, and update the second receiving/sending switching interval to the first switching time after the effective time.

In a possible design, when updating the second receiving/sending switching interval of the terminal node to the first switching time in response to the negotiation request, the processor is configured to feed back acknowledgment response information to the management node by using the transceiver in response to the negotiation request, receive, by using the transceiver, acknowledgment information delivered by the management node in response to the acknowledgment response information, where the acknowledgment information indicates the terminal node to update the second receiving/sending switching interval to the first switching time, and update the second receiving/sending switching interval to the first switching time.

In a possible design, any receiving/sending switching interval includes at least one of an intra-frame space and a minimum subevent space.

According to a seventh aspect, this disclosure provides a communication system, including the management node according to any one of the third aspect or the possible designs of the third aspect and the terminal node according to any one of the fourth aspect or the possible designs of the fourth aspect, or including the management node according to any one of the fifth aspect or the possible designs of the fifth aspect and the terminal node according to any one of the sixth aspect or the possible designs of the sixth aspect.

According to an eighth aspect, this disclosure provides a computer storage medium. The computer storage medium stores a computer-readable program, and when the computer-readable program is run on a computer, the computer is enabled to perform the method described according to any one of the first aspect or the possible designs of the first aspect, or the computer is enabled to perform the method described according to any one of the second aspect or the possible designs of the second aspect.

According to a ninth aspect, this disclosure provides a computer program product. When the computer program product runs on a computer, the computer is enabled to perform the method described according to any one of the first aspect or the possible designs of the first aspect, or the computer is enabled to perform the method described according to any one of the second aspect or the possible designs of the second aspect.

According to a tenth aspect, an embodiment of this disclosure provides a chip. The chip is configured to read a computer program stored in a memory, to perform the method described according to any one of the first aspect or the possible designs of the first aspect, or perform the method described according to any one of the second aspect or the possible designs of the second aspect.

According to an eleventh aspect, an embodiment of this disclosure provides a chip system. The chip system includes a processor, configured to support a computer apparatus in implementing the method described according to any one of the first aspect or the possible designs of the first aspect, or implementing the method described according to any one of the second aspect or the possible designs of the second aspect.

In a possible design, the chip system further includes a memory. The memory is configured to store a program and data that are necessary for the computer apparatus.

In a possible design, the chip system includes a chip, or includes a chip and another discrete device.

For beneficial effects of the third aspect to the eleventh aspect, refer to descriptions of the beneficial effects of the first aspect and/or the second aspect. Details are not described herein again.

DESCRIPTION OF EMBODIMENTS

Figure 1A:
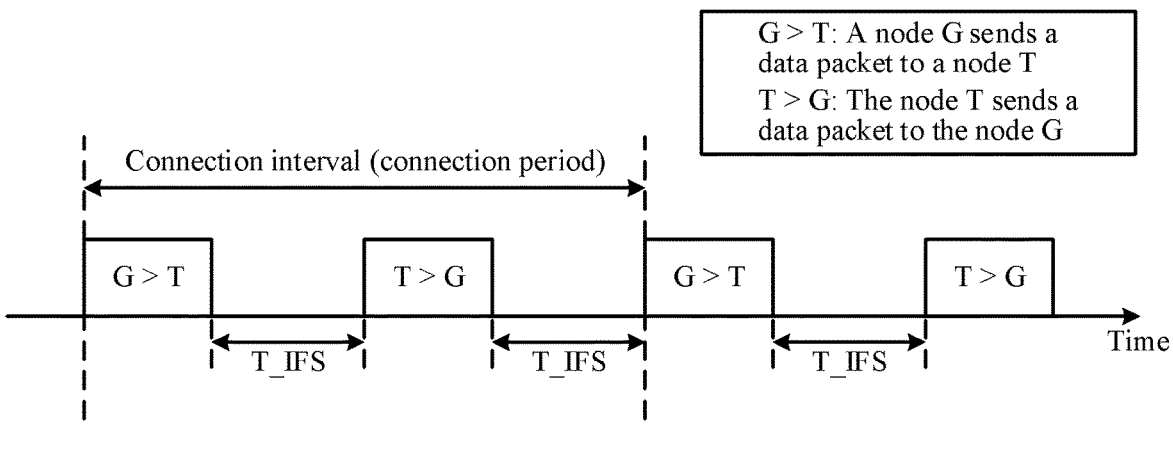
FIG. 1A is a schematic diagram of an intra-frame space in an asynchronous bidirectional link.

To make purposes, technical solutions, and advantages of embodiments of this disclosure clearer, the following further describes embodiments in detail with reference to the accompanying drawings. The terms "first" and "second" below in the description of embodiments of this disclosure are merely used for a description purpose, and shall not be understood as an indication or implication of relative importance or implicit indication of a quantity of indicated technical features. Therefore, a feature limited by "first" or "second" may explicitly or implicitly include one or more features.

For ease of understanding, examples of descriptions of concepts related to this disclosure are provided for reference.

(1) A terminal device is a device that provides voice and/or data connectivity for a user. The terminal device may also be referred to as user equipment (UE), a mobile terminal (MT), or the like.

In embodiments of this disclosure, the terminal device may be a device that supports BLUETOOTH communication. The terminal device includes but is not limited to a mobile phone, a tablet computer, a notebook computer, a palmtop computer, a mobile Internet device (MID), a wearable device (for example, a smart watch or a smart band), a vehicle, an in-vehicle device (for example, a car, an electric vehicle, an airplane, a ship, a train, or a high-speed railway), a virtual reality (VR) device, an augmented reality (AR) device, a wireless terminal in industrial control, a smart home device (for example, a refrigerator, a television, an air conditioner, an electric meter, or the like), a smart robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, a smart robot, a hot air balloon, an unmanned aerial vehicle, or an airplane), or the like.

For example, the terminal device in this embodiment includes but is not limited to running iOS®, ANDROID®, MICROSOFT®, or another operating system.

(2) A management node is a node that sends data scheduling information. The management node may manage a terminal node that establishes a communication connection to the management node.

The terminal node is a node that receives data scheduling information and sends, based on the received data scheduling information, data or performs data processing.

Device forms of the management node and the terminal node provided in embodiments may be the foregoing terminal device, or may be a function module or a unit disposed in the terminal device, or may be a chip, an integrated circuit, or the like deployed in the terminal device.

(3) A receiving/sending switching interval is time needed by a communication apparatus to perform receiving/sending switching, and is a time interval between an end moment of a former process and a start moment of a latter process in a data sending process and a data receiving process that are adjacent. The receiving/sending switching interval may also be referred to as receiving/sending switching time, a receiving/sending switching interval parameter, or the like. In a BLUETOOTH standard, receiving/sending switching intervals may be classified into three types an intra-frame space (T_IFS), a minimum subevent space (T_MSS), and a minimum auxiliary frame space (minimum AUX frame space, T_MAFS).

Specifically, based on a current BLUETOOTH standard, in a communication process of two nodes, for example, a main control node and a secondary node, a specific channel needs to be used to send and receive data, and after specific time, a new channel is switched to, to receive and send data. A process in which two devices receive and send data (a data packet) through a same channel may be referred to as a connection event, and in different connection events, data is received and sent through different channels. A connection interval is a time interval between a start moment of a connection event and a start moment of a next connection event, and may also be referred to as a connection period, that is, a period of a connection event. Further, one connection event may be divided into a plurality of subevents. In each subevent (or subevent period), two nodes separately perform only one time of data packet receiving and only one time of data packet sending.

The intra-frame space T_IFS is a time interval between two consecutive data packets on a same channel, to be specific, a time interval between an end moment of a former data packet transmission and a start moment of a latter data packet transmission in a same connection event or a same subevent. Currently, T_IFS is fixed to 150 microseconds (μs). For example, as shown in FIG. 1A, data packets may be received and sent between a main control node G and a secondary node T in a connection event (or a connection interval), and a time interval between two adjacent data packets is T_IFS.

It should be noted that in related accompanying drawings of embodiments of this disclosure, an example in which one connection event includes two subevents and a process of performing one time of data packet receiving and one time of data packet sending is performed in one connection period is used for description. Actually, a process of performing a plurality of times of data packet receiving and a plurality of times of data packet sending may alternatively be performed in one connection period.

Figure 1B:
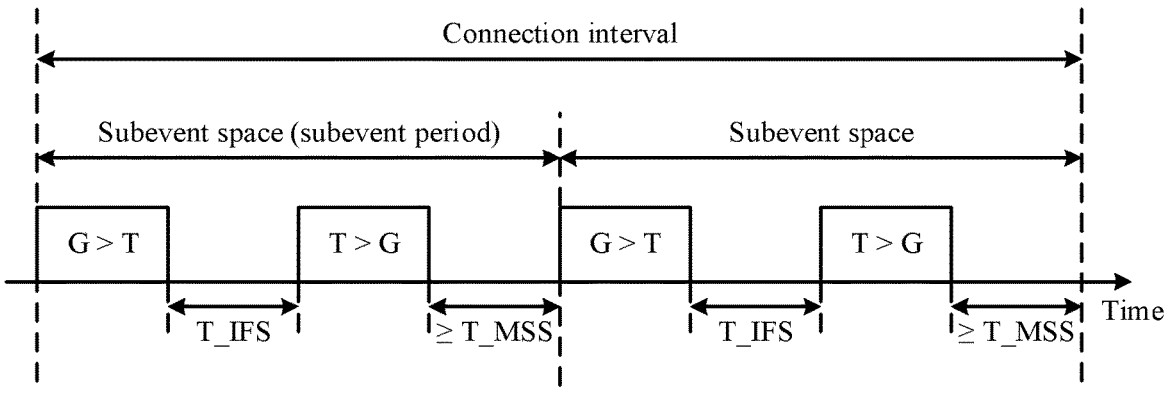
FIG. 1B is a schematic diagram of an intra-frame space and a minimum subevent space in a synchronous bidirectional link.

The minimum subevent space is a minimum time interval between the end of the last bit of the last data packet of a former subevent and the start of the $1^{st}$ bit of the $1^{st}$ data packet of a latter subevent. Currently, T_MSS is fixed to 150 μs. For example, as shown in FIG. 1B, data packets may be separately received and sent between the main control node G and the secondary node T in a subevent (or a subevent space or a subevent period (sub_interval)). In this case, a time interval between two adjacent data packets in a same subevent is T_IFS, and a minimum time interval between two adjacent subevents is T_MSS.

The minimum auxiliary frame space T_MAFS is a minimum time interval between the end of the last bit of a previous data packet that includes an auxiliary broadcast packet pointer (AuxPtr) and the start of the 1st bit of an auxiliary packet. Currently, the T_MAFS is fixed to 300 μs.

It should be understood that, in embodiments of this disclosure, "at least one" means one or more, and "a plurality of" means two or more. The term "and/or" describes an association relationship between associated objects, and indicates that three relationships may exist. For example, A and/or B may indicate the following cases; Only A exists, both A and B exist, and only B exists, where A and B may be singular or plural. The character "/" generally indicates an "or" relationship between the associated objects. "At least one of the following" or similar expressions refer to any combination of these items, including any combination of single items or a plurality of items. For example, at least one of a, b, or c may indicate a, b, c, a and b, a and c, b and c, or a, b, and c, where a, b, and c may be one or more objects.

The receiving/sending switching interval is time needed by the communication apparatus to perform receiving/sending switching. Currently, in the BLUETOOTH standard, the receiving/sending switching interval is fixed. In all communication scenarios, a short-range wireless communication apparatus arranges an execution time point of a next event or task based on the fixed receiving/sending switching interval, and cannot perform optimization based on an actual scenario. In addition, in a receiving/sending switching control process, even if the receiving/sending switching interval is redundant, a fixed air interface slot needs to be reserved. Consequently, a data retransmission opportunity of the short-range wireless communication apparatus and a communication opportunity with more short-range wireless communication apparatuses are occupied. Therefore, currently, flexibility of performing receiving/sending switching control based on the receiving/sending switching interval is low, and a resource utilization rate in the receiving/sending switching process is also low.

Figure 2:
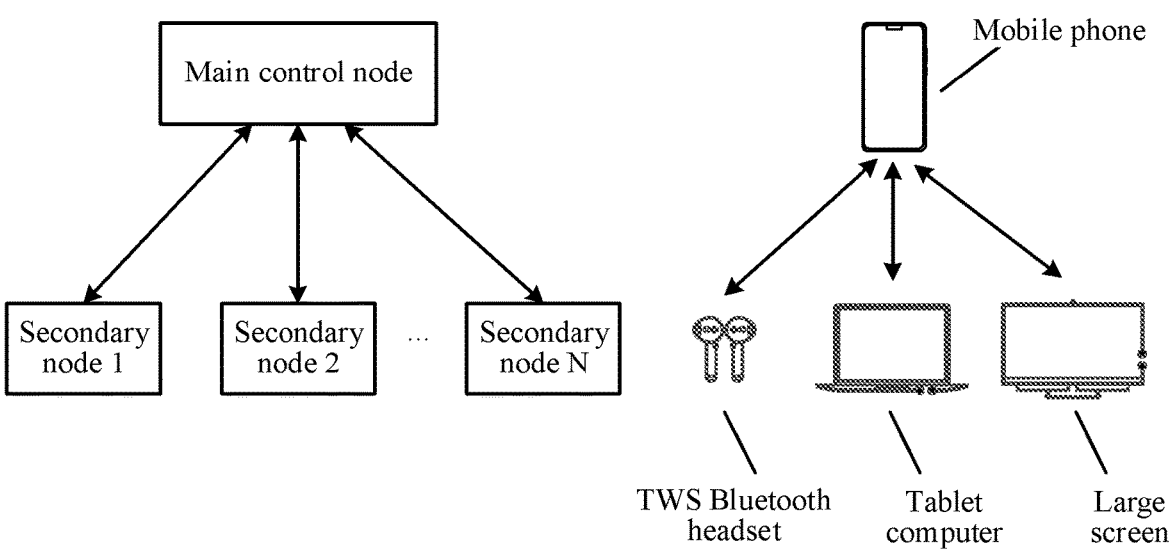
FIG. 2 is a schematic diagram of a communication system including a plurality of node devices.

With continuous update and development of technologies, task execution of a hardware device is continuously accelerated, so that it is possible to shorten the receiving/sending switching interval. In addition, all-scenario applications around terminal devices (such as mobile phones) are increasingly popular. For example, as shown in FIG. 2, when a mobile phone is used as a main control node, the mobile phone may be connected to a plurality of terminal nodes (which may also be referred to as secondary nodes) such as a true wireless stereo (TWS) BLUETOOTH headset, a tablet computer, and a large screen. The main control node may separately communicate with N (where N is a positive integer) connected terminal nodes to separately control the N terminal nodes. Therefore, in such a multi-device and multi-service scenario, a manner of improving an air interface utilization rate by shortening the receiving/sending switching interval may be considered, to further optimize user experience. Based on this, this disclosure provides a receiving/sending switching control method, a management node, and a terminal node, to improve flexibility of receiving/sending switching control, and improve a resource utilization rate in a receiving/sending switching process.

It should be noted that the receiving/sending switching control method, the management node, and the terminal node that are provided in this disclosure may be applied to a scenario of communication between any two short-range wireless communication apparatuses that need to perform receiving/sending switching during communication. The short-range wireless communication apparatus in embodiments of this disclosure may be a terminal device, an apparatus deployed in a terminal device, or another apparatus. This is not limited in embodiments of this disclosure.

The following describes in detail, with reference to specific embodiments, the receiving/sending switching control method, the management node, and the terminal node that are provided in this disclosure.

Figure 3:
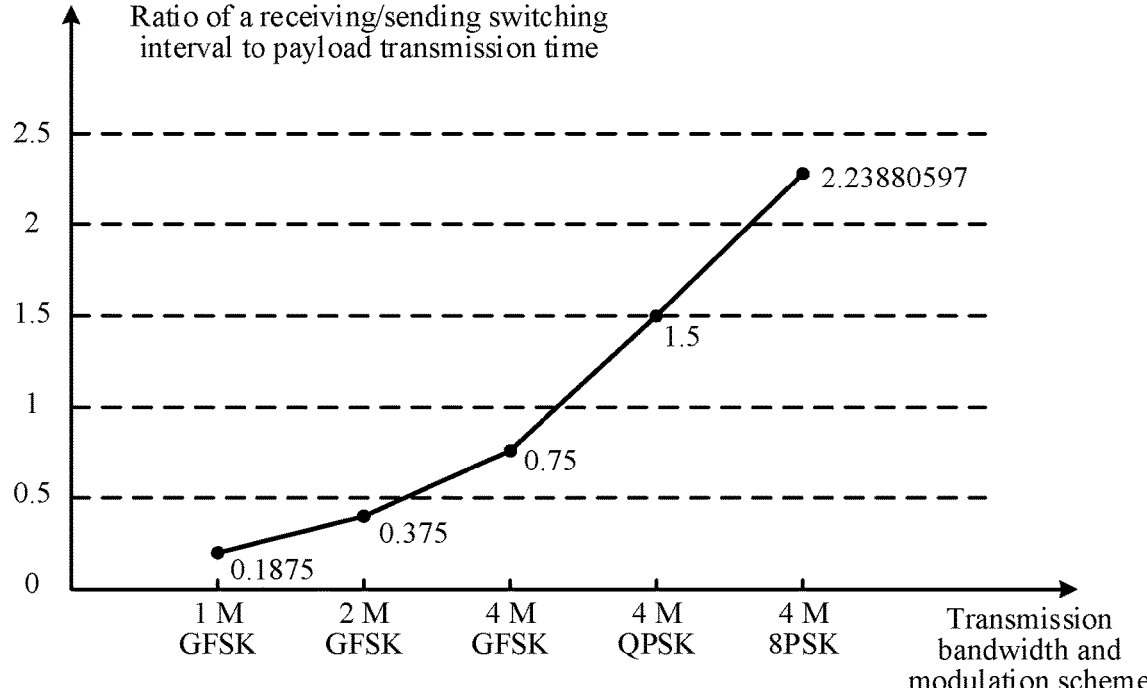
FIG. 3 is a schematic diagram of a ratio of a receiving/sending switching interval to payload transmission time according to an embodiment.

FIG. 3 is a schematic diagram of a ratio of a receiving/sending switching interval to payload transmission time according to an embodiment of this disclosure.

For example, in a current BLUETOOTH standard, the receiving/sending switching interval is 150 μs, and a payload is transmitted by 100 bytes. The ratio of the receiving/sending switching interval to the payload transmission time is shown in FIG. 3. It can be learned through comparison between ratios of receiving/sending switching intervals to payload transmission time that correspond to four cases, namely, 1 M transmission bandwidth and a Gaussian frequency-shift keying (GFSK) modulation scheme, 2 M transmission bandwidth and the GFSK modulation scheme, 4 M bandwidth and the GFSK modulation scheme, the 4 M transmission bandwidth and a quadrature phase shift keying (QPSK) modulation scheme, and the 4 M transmission bandwidth and an 8 phase shift keying (8PSK) modulation scheme that, because the receiving/sending switching interval is fixed, higher bandwidth indicates a higher modulation order, a higher ratio of the receiving/sending switching interval to the payload transmission time, and a low air interface utilization rate.

For the foregoing problem, in the receiving/sending switching control method provided in embodiments of this disclosure, a receiving/sending switching interval is set to a plurality of values, and a receiving end and a sending end may negotiate to determine an appropriate value of the receiving/sending switching interval, and perform receiving/sending switching control based on a negotiated receiving/sending switching interval. This improves control flexibility of receiving/sending switching control and balances various service requirements such as an air interface utilization rate and a service throughput rate.

Figure 4:
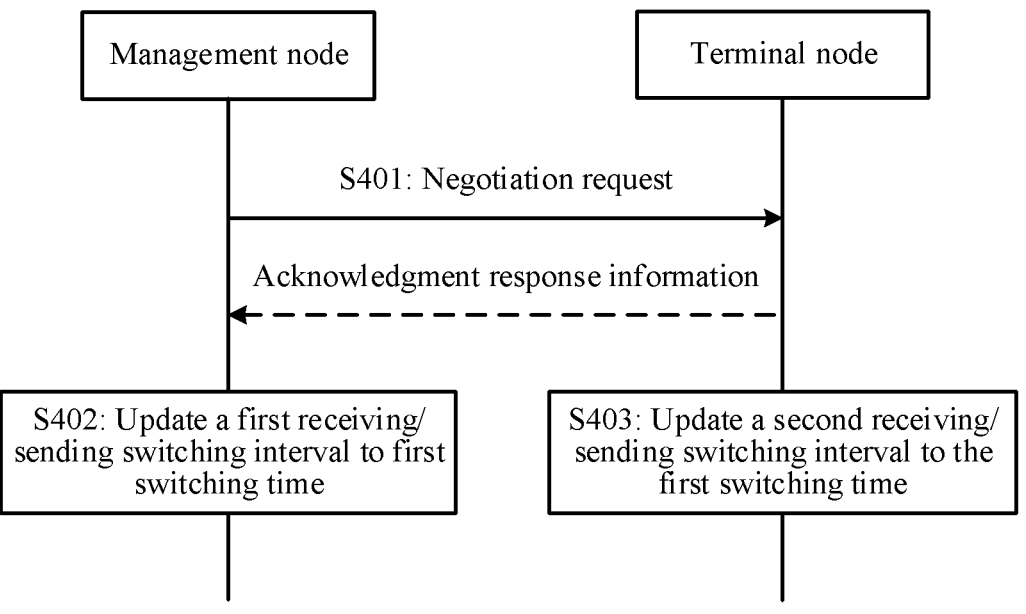
FIG. 4 is a schematic diagram of a receiving/sending switching control method according to an embodiment.

FIG. 4 is a schematic diagram of a receiving/sending switching control method according to an embodiment of this disclosure. As shown in FIG. 4, the method includes the following steps.

S401: A management node sends, to a terminal node, a negotiation request used to update a receiving/sending switching interval to first switching time, and the terminal node receives the negotiation request. The receiving/sending switching interval includes a first receiving/sending switching interval of the management node and a second receiving/sending switching interval of the terminal node.

In this embodiment of this disclosure, the management node and the terminal node may be any two short-range wireless communication apparatuses that can establish a bidirectional link for performing communication. Optionally, the management node and the terminal node are apparatuses that perform communication based on a BLUETOOTH manner.

Initially, the management node and the terminal node may establish a communication connection based on a default receiving/sending switching interval, and establish one bidirectional link for performing communication. For example, the default receiving/sending switching interval may be second switching time. The second switching time may be specified time, for example, time corresponding to a receiving/sending switching interval specified in a current related standard. In a subsequent communication process of the management node and the terminal node, the management node may negotiate a new receiving/sending switching interval with the terminal node based on an actual service requirement, and then perform receiving/sending switching control based on the new receiving/sending switching interval. In addition, in the subsequent communication process, the management node and the terminal node may continue to negotiate and update the receiving/sending switching interval.

In this embodiment of this disclosure, the receiving/sending switching interval used by the management node to perform receiving/sending switching control is the first receiving/sending switching interval, and the receiving/sending switching interval used by the terminal node to perform receiving/sending switching control is the second receiving/sending switching interval. The first receiving/sending switching interval needs to be consistent with the second receiving/sending switching interval, to ensure normal communication between the management node and the terminal node.

In an optional implementation, when determining to update the receiving/sending switching interval to the first switching time, the management node may send the negotiation request to the terminal node, to indicate to update the first receiving/sending switching interval of the management node and the second receiving/sending switching interval of the terminal node to the first switching time. The negotiation request carries the first switching time. After receiving the negotiation request, the terminal node may determine that the second receiving/sending switching interval needs to be updated to the first switching time.

Specifically, in the communication process, when the management node and the terminal node perform receiving/sending switching control based on the receiving/sending switching interval (that is, the old receiving/sending switching interval) corresponding to the second switching time, and the management node needs to update the receiving/sending switching interval, the management node and the terminal node may determine, based on a service requirement, a hardware capability, and the like, the first switching time corresponding to the new receiving/sending switching interval, and send the first switching time to the terminal node by using a negotiation request. After receiving the first switching time from the management node, the terminal node determines that the terminal node can support performing receiving/sending switching control based on the receiving/sending switching interval corresponding to the first switching time, and may perform switching with the management node to perform receiving/sending switching control based on the receiving/sending switching interval corresponding to the first switching time.

For example, when determining that the first switching time is 100 μs, the management node may directly send 100 μs to the terminal node, and the terminal node may directly determine that an updated receiving/sending switching interval is 100 μs.

In another optional implementation, the management node and the terminal node may pre-negotiate a plurality of pieces of candidate switching time, or obtain a plurality of pieces of candidate switching time that are pre-specified and available for the short-range wireless communication apparatus. Therefore, when determining that the receiving/sending switching interval needs to be updated, the management node may select and determine the first switching time from the plurality of pieces of candidate switching time, and indicate the selected first switching time to the terminal node by using the negotiation request. The terminal node may determine the first switching time from the plurality of pieces of candidate switching time based on the indication of the management node, to update the second receiving/sending switching interval to the first switching time, and perform receiving/sending switching control based on the first switching time.

For example, the foregoing plurality of pieces of candidate switching time includes time of values of three different levels, namely, 50 μs of a first level, 100 μs of a second level, and 150 μs of a third level. In this case, when selecting and determining the first switching time of 100 μs from the values of the three levels, the management node may indicate, to the terminal node by using the negotiation request, that the updated receiving/sending switching interval is at the second level, and the terminal node may determine, based on the indication of the management node, that the second receiving/sending switching interval needs to be updated to 100 μs in the values of the three levels.

In some embodiments of this disclosure, when a large quantity of services are processed or a service is important, the management node may reduce the receiving/sending switching interval, in other words, update the receiving/sending switching interval to switching time with a small value. Because an updated receiving/sending switching interval is small, the management node and the terminal node can transmit more data packets within same time. This improves a service throughput rate. In addition, time needed for performing one data packet receiving/sending process between the management node and the terminal node is shortened. This can save air interface resources.

In some embodiments of this disclosure, as shown in FIG. 4, after receiving the negotiation request from the management node, and before updating the second receiving/sending switching interval to the first switching time, the terminal node may first feed back acknowledgment response information to the management node in response to the negotiation request. The acknowledgment response information notifies that the negotiation request (or the first switching time) is received and that switching to the first switching time to perform receiving/sending switching control is acknowledged.

After receiving the acknowledgment response information fed back by the terminal node in response to the negotiation request, the management node may determine that the terminal node receives the negotiation request (or the first switching time), and that the terminal node agrees to switch to the first switching time to perform receiving/sending switching control. In this case, the management node may update the first receiving/sending switching interval to the first switching time based on the acknowledgment response information.

S402: The management node updates a first receiving/sending switching interval of the management node to the first switching time.

S403: The terminal node updates the second receiving/sending switching interval of the terminal node to the first switching time.

In the foregoing step S402 and step S403, when the management node and the terminal node separately update the receiving/sending switching interval used by the management node and the terminal node to the first switching time, either of the following Manner 1 and Manner 2 may be used for implementation.

Manner 1

The management node and the terminal node update the receiving/sending switching interval by setting an instant time point as the effective time through signaling exchange.

In this manner, after receiving the acknowledgment response information sent by the terminal node, the management node sends indication information to the terminal node in response to the acknowledgment response information. The indication information indicates the effective time for updating the receiving/sending switching interval. After receiving the indication information delivered by the management node, the terminal node may determine, based on the indication information, to update the second receiving/sending switching interval to the first switching time at the corresponding effective time. The indication information carries the effective time.

When indicating, to the terminal node, the effective time for updating the second receiving/sending switching interval of the terminal node, the indication information also indicates, to the management node, the effective time for updating the first receiving/sending switching interval of the management node. That is, the indication information essentially indicates each of the management node and the terminal node to update the receiving/sending switching interval at the effective time.

In some embodiments of this disclosure, after sending the negotiation request to the terminal node, the management node may directly indicate the effective time to the terminal node by using indication information. In other words, after receiving the negotiation request from the management node, the terminal node does not need to return the acknowledgment response information to the management node. This simplifies an interaction procedure and accelerates update of the receiving/sending switching interval.

After sending the indication information to the terminal node, the management node waits until the effective time arrives, updates the first receiving/sending switching interval to the first switching time, and performs receiving/sending switching control based on the updated first receiving/sending switching interval from the effective time. Similarly, after receiving the indication information from the management node, the terminal node also waits until the effective time arrives, updates the second receiving/sending switching interval to the first switching time, and performs receiving/sending switching control based on the updated second receiving/sending switching interval from the effective time.

In the foregoing manner, after the specified effective time arrives, the management node and the terminal node both update the receiving/sending switching interval, and perform receiving/sending switching control by using the updated receiving/sending switching interval. This ensures synchronization of updating the receiving/sending switching interval between the management node and the terminal node, and further ensures synchronization and accuracy of performing receiving/sending switching control by the management node and the terminal node.

Manner 2

When negotiating, determining, and updating the receiving/sending switching interval through signaling exchange, the management node and the terminal node directly update the receiving/sending switching interval.

In this manner, in an optional implementation, after sending the acknowledgment response information to the management node, the terminal node immediately updates the second receiving/sending switching interval to the first switching time, and after receiving the acknowledgment response information sent by the terminal node, the management node also immediately updates the first receiving/sending switching interval to the first switching time.

In another optional implementation, after receiving the acknowledgment response information sent by the terminal node, the management node sends acknowledgment information to the terminal node in response to the acknowledgment response information, to indicate the terminal node to update the second receiving/sending switching interval to the first switching time. After sending the acknowledgment information to the terminal node, the management node immediately updates the first receiving/sending switching interval to the first switching time. After receiving the acknowledgment information, the terminal node also immediately updates the second receiving/sending switching interval to the first switching time. The acknowledgment information may be an acknowledgment character (ACK), and the acknowledgment character ACK is also used to acknowledge receiving of the acknowledgment response information.

After the management node sends the acknowledgment information to the terminal node, the management node may fail to determine whether the terminal node receives the acknowledgment information and whether the terminal node updates the second receiving/sending switching interval of the terminal node. Therefore, in consideration of a case in which the terminal node fails to update the second receiving/sending switching interval, in some embodiments of this disclosure, after sending the acknowledgment information to the terminal node, the management node may monitor a data packet from the terminal node in a specified receiving window after target switching time. A value of the target switching time is a value of the smaller one of the first receiving/sending switching interval that is not updated and the first switching time, that is, a value of the smaller one of the second switching time and the first switching time. A size of the specified receiving window is greater than or equal to a sum of a first target value and a second target value, and a value of the first target value is a size value of a corresponding receiving window in which the management node monitors a second data packet from the terminal node before the management node updates the first receiving/sending switching interval to the first switching time, that is, the size value of the corresponding receiving window in which the management node monitors the second data packet from the terminal node in a process of performing receiving/sending switching control by using the second switching time. A value of the second target value is a value of a difference between the first receiving/sending switching interval that is not updated and an updated first receiving/sending switching interval, that is, a difference between the second switching time and the first switching time.

For example, when the second switching time is 150 μs, the first switching time is 120 μs, and the size of the corresponding receiving window in which the management node performs receiving/sending switching control based on the second switching time is 300 μs, the management node may determine that the target switching time is 120 μs, the first target value is 300 μs, and the second target value is 30 μs (that is, 150 μs to 120 μs), and the size of the specified receiving window needs to be greater than or equal to 330 μs (that is, 300 μs+30 μs). After the management node sends the acknowledgment information to the terminal node, if the terminal node switches to the first switching time to perform receiving/sending switching control, the terminal node performs a data packet receiving/sending process based on a receiving/sending switching interval of 120 μs, otherwise, the terminal node performs a data packet receiving/sending process based on a receiving/sending switching interval of 150 μs. The management node may receive a data packet from the terminal node only in the receiving window. Therefore, the management node performs receiving monitoring based on the target switching time of 120 μs and the receiving window of 330 μs. This can ensure that regardless of a receiving/sending switching interval used by the terminal node, when the terminal node starts to send the data packet to the management node, the receiving window of the management node is open, and the size of the receiving window is enough to receive the data packet from the terminal node, to ensure that the management node can successfully receive the data packet from the terminal node.

When the management node receives a first data packet from the terminal node in the specified receiving window, the management node may determine, based on a receiving moment of the first data packet, whether the terminal node receives the acknowledgment information, to determine whether to update the receiving/sending switching interval.

Specifically, when determining that the receiving moment is consistent with the target receiving moment, the management node determines that the terminal node receives the acknowledgment information, and the management node updates the first receiving/sending switching interval to the first switching time. When determining that the receiving moment is inconsistent with the target receiving moment, the management node determines that the terminal node does not receive the acknowledgment information. The management node may send the acknowledgment information to the terminal node again, continue to monitor the data packet from the terminal node in the specified receiving window based on the target switching time, and determine, based on the data packet from the terminal node, whether the terminal node receives the acknowledgment information, and perform other subsequent steps. When determining the terminal node receives the acknowledgment information, the management node updates the first receiving/sending switching interval to the first switching time. In the foregoing process, if receiving the acknowledgment information, the terminal node immediately updates the second receiving/sending switching interval to the first switching time. The target receiving moment is a receiving moment that is calculated by the management node and that corresponds to the first data packet when the first receiving/sending switching interval is the first switching time, that is, a receiving moment that corresponds to the first data packet when the management node performs receiving/sending switching control based on the first switching time.

In some embodiments of this disclosure, any receiving/sending switching interval includes at least one of an intra-frame space and a minimum subevent space. Both the intra-frame space and the minimum subevent space are receiving/sending switching intervals that are defined in a BLUETOOTH standard and that exist in the bidirectional link. Therefore, the intra-frame space and the minimum subevent space may be determined through negotiation between a receiving end and a sending end.

In some embodiments of this disclosure, the management node performs receiving/sending switching control based on the first switching time. After sending a data packet to the terminal node, the management node receives a data packet from the terminal node after the first switching time, and/or after receiving a data packet from the terminal node, the management node sends a data packet to the terminal node after the first switching time. A manner in which the terminal node performs receiving/sending switching control based on the first switching time is similar to that on a management node side. Details are not described herein.

It should be noted that an execution sequence of step S402 and step S403 is merely used as an example of a possible case. The execution sequence of step S402 and step S403 is flexible and variable. In consideration of a problem such as an information transmission delay in an actual scenario, step S402 may be performed before step S403, or may be performed simultaneously with step S403, or may be performed after step S403.

In the foregoing embodiments, in a mutual communication process between the management node and the terminal node, a value of the receiving/sending switching interval may be flexibly adjusted. In this way, flexibility of the receiving/sending switching control is improved, and the receiving/sending switching interval can be adjusted based on requirements for air interface utilization rate and a resource utilization rate, to further improve a resource utilization rate in the receiving/sending switching process, and enable the receiving/sending switching interval to adapt to service requirements in a plurality of different scenarios.

The following describes, with reference to specific embodiments, the receiving/sending switching control method provided in this disclosure.

For ease of description, in the following embodiment, an example in which the management node is a main control node G in a BLUETOOTH communication scenario, and the terminal node is a terminal node T communicating with the main control node G is used to describe the receiving/sending switching control method provided in embodiments of this disclosure.

In the BLUETOOTH communication scenario, two node devices that perform communication communicate with each other in a BLUETOOTH manner, and bidirectional links between the two node devices may be classified into a synchronous bidirectional link and an asynchronous bidirectional link. Receiving/sending switching intervals in the synchronous bidirectional link are T_IFS and T_MSS, and a receiving/sending switching interval in the asynchronous bidirectional link is T_IFS. The two types of communication links support signaling parameter negotiation, have an ACK feedback, and cover an extremely large part of current BLUETOOTH communication scenarios. Therefore, in the BLUETOOTH communication scenario, the method provided in embodiments of this disclosure may be applied to two node devices that perform communication through the synchronous bidirectional link or the asynchronous bidirectional link. That is, the main control node G and the terminal node T may perform communication through the synchronous bidirectional link or the asynchronous bidirectional link.

In some embodiments of this disclosure, a plurality of levels may be set for T_IFS and T_MSS in the foregoing two bidirectional links. For example, if both T_IFS and T_MSS set in a current standard are 150 μs, the plurality of levels that are set for T_IFS and T_MSS may be 60 μs, 90 μs, 120 μs, and 150 μs. In a communication process, the main control node G and the terminal node T may select a receiving/sending switching interval of an appropriate level from the receiving/sending switching intervals of the plurality of levels through signaling exchange and negotiation based on an actual hardware support capability and actual service requirements of the two parties, to perform receiving/sending switching control.

Optionally, the terminal node T may be any one of a plurality of terminal node devices communicating with the main control node G. For example, the main control node may be the mobile phone in FIG. 2, and the terminal node T may be any terminal node (for example, the TWS BLUETOOTH headset) in FIG. 2.

Embodiment 1 In a receiving/sending switching control method provided in this embodiment, a main control node G and a terminal node T update a receiving/sending switching interval in Manner 1 provided in the foregoing embodiments. Details descriptions are provided below.

Figure 5:
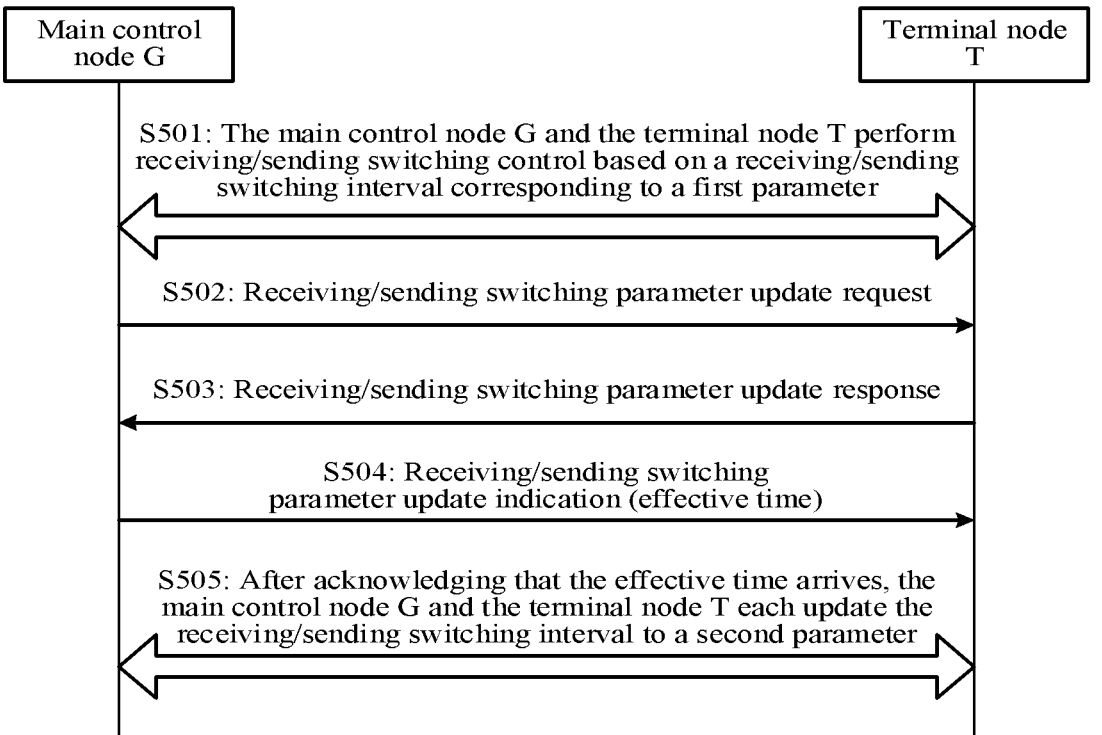
FIG. 5 is a schematic flowchart of a receiving/sending switching control method according to an embodiment.

FIG. 5 is a schematic flowchart of a receiving/sending switching control method according to an embodiment of this disclosure. As shown in FIG. 5, a procedure of the method includes the following steps.

S501: In a communication process, a main control node G and a terminal node T perform receiving/sending switching control based on a receiving/sending switching interval corresponding to a first parameter.

For example, by default, the main control node G and the terminal node T may establish a bidirectional link based on the receiving/sending switching interval corresponding to the first parameter, and perform communication through the bidirectional link. Alternatively, after establishing the bidirectional link, in the communication process, the main control node G and the terminal node T may perform receiving/sending switching control based on the receiving/sending switching interval corresponding to the first parameter.

The first parameter may be a receiving/sending switching interval specified in a current BLUETOOTH standard, for example, may be 150 μs, or the first parameter may be a receiving/sending switching interval pre-agreed on by the main control node and the terminal node T.

S502: The main control node G sends a receiving/sending switching parameter update request to the terminal node T.

When initiating update of the receiving/sending switching interval, the main control node G may send the receiving/sending switching parameter update request (that is, the negotiation request described above) to the terminal node T, to request the terminal node T to update the receiving/sending switching interval. The receiving/sending parameter update request carries a second parameter, that is, an updated receiving/sending switching interval.

S503: The terminal node T sends a receiving/sending switching parameter update response to the main control node G.

After receiving the receiving/sending switching parameter update response from the main control node G, the terminal node T acknowledges that the receiving/sending switching interval can be updated to the second parameter requested by the main control node G, and then the terminal node T returns the receiving/sending switching parameter update response (that is, the acknowledgment response information described above) to the main control node G, to acknowledge that receiving/sending switching control is to be performed based on the second parameter.

S504: The main control node G sends a receiving/sending switching parameter update indication to the terminal node T. The receiving/sending switching parameter update indication carries information about an effective time.

After receiving the receiving/sending switching parameter update response of the terminal node T, the main control node G sends the receiving/sending switching parameter update indication (that is, the indication information described above) to the terminal node T, to indicate information about an updated instant time point (that is, the effective time described above) of the receiving/sending switching interval to the terminal node T. After receiving the receiving/sending switching parameter update indication, the terminal node T updates the receiving/sending switching interval based on the information about the instant time point indicated by the receiving/sending parameter update indication.

S505: After acknowledging that the effective time arrives, the main control node G and the terminal node T update the receiving/sending switching interval to the second parameter.

After updating the receiving/sending switching interval to the second parameter, the main control node G and the terminal node T perform receiving/sending switching control based on the receiving/sending switching interval corresponding to the second parameter.

In the foregoing embodiment, the main control node G and the terminal node T both update the receiving/sending switching interval after the specified instant time point arrives, so that a receiving/sending switching process can be flexibly controlled through the update of the receiving/sending switching interval, and synchronization and accuracy of the receiving/sending switching control between the main control node G and the terminal node T are ensured.

Embodiment 2

In a receiving/sending switching control method provided in this embodiment, a main control node G and a terminal node T update a receiving/sending switching interval in Manner 2 provided in the foregoing embodiments. Details descriptions are provided below.

Figure 6:
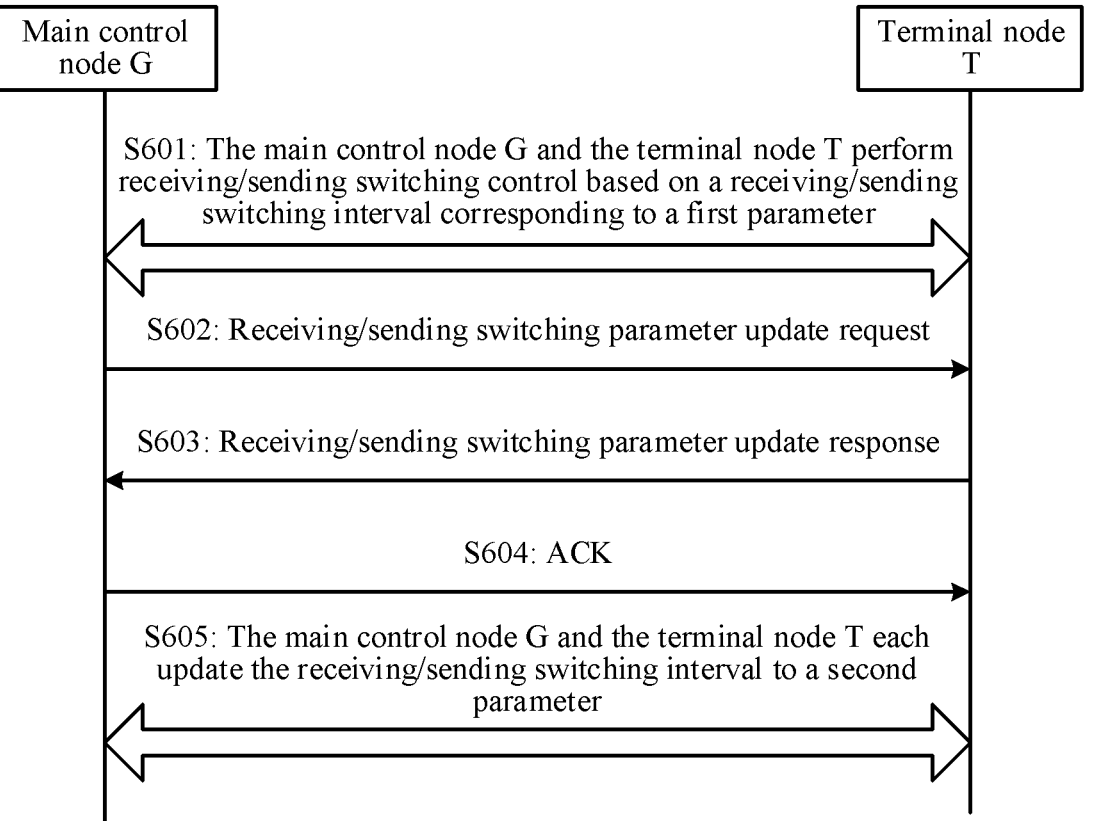
FIG. 6 is a schematic flowchart of a receiving/sending switching control method according to an embodiment.

FIG. 6 is a schematic flowchart of a receiving/sending switching control method according to an embodiment of this disclosure. As shown in FIG. 6, a procedure of the method includes the following steps.

S601: In a communication process, a main control node G and a terminal node T perform receiving/sending switching control based on a receiving/sending switching interval corresponding to a first parameter.

S602: The main control node G sends a receiving/sending switching parameter update request to the terminal node T.

S603: The terminal node T sends a receiving/sending switching parameter update response to the main control node G.

For execution of steps S601 to S603, refer to execution of steps S501 to S503 in Embodiment 1. Details are not described herein again.

S604: The main control node G sends an ACK to the terminal node T.

S605: After sending the ACK to the terminal node T, the main control node G updates the receiving/sending switching interval to a second parameter, and after receiving the ACK from the main control node G, the terminal node T updates the receiving/sending switching interval to the second parameter.

After updating the receiving/sending switching interval to the second parameter, the main control node G and the terminal node T both perform receiving/sending switching control based on an updated receiving/sending switching interval.

Optionally, the foregoing step S605 may alternatively be replaced with the following step: After sending the ACK to the terminal node T, the main control node G monitors a data packet from the terminal node T in a specified receiving window after target switching time. When a data packet from the terminal node T is received in the specified receiving window, and it is determined, based on a receiving moment of the data packet, that the terminal node T receives the ACK, the receiving/sending switching interval is updated to the second parameter.

For content such as determining of the target switching time and a size of the specified receiving window, refer to the method provided in the foregoing embodiments. Details are not described herein again.

In the foregoing steps, after sending the ACK to the terminal node T, the main control node G fails to determine whether the terminal node T receives the ACK. Therefore, when receiving the data packet from the terminal node T, the main control node G expands the receiving window for receiving the data packet in the foregoing manner, to ensure that if the terminal node T does not receive the ACK and sends the data packet based on the receiving/sending switching interval corresponding to the first parameter, the main control node G can still receive the data packet. After receiving the data packet, the main control node may determine, based on receiving time of the data packet, whether the terminal node T receives the ACK, and then determine whether the receiving window further needs to be expanded when a data packet from the terminal node T is received next time.

In the foregoing embodiment, after the main control node G and the terminal node T acknowledge an updated receiving/sending parameter by using the ACK, the two ends immediately update the receiving/sending switching interval to the second parameter, to update the receiving/sending switching interval more quickly. This accelerates service processing.

Figures 7A, 7B:
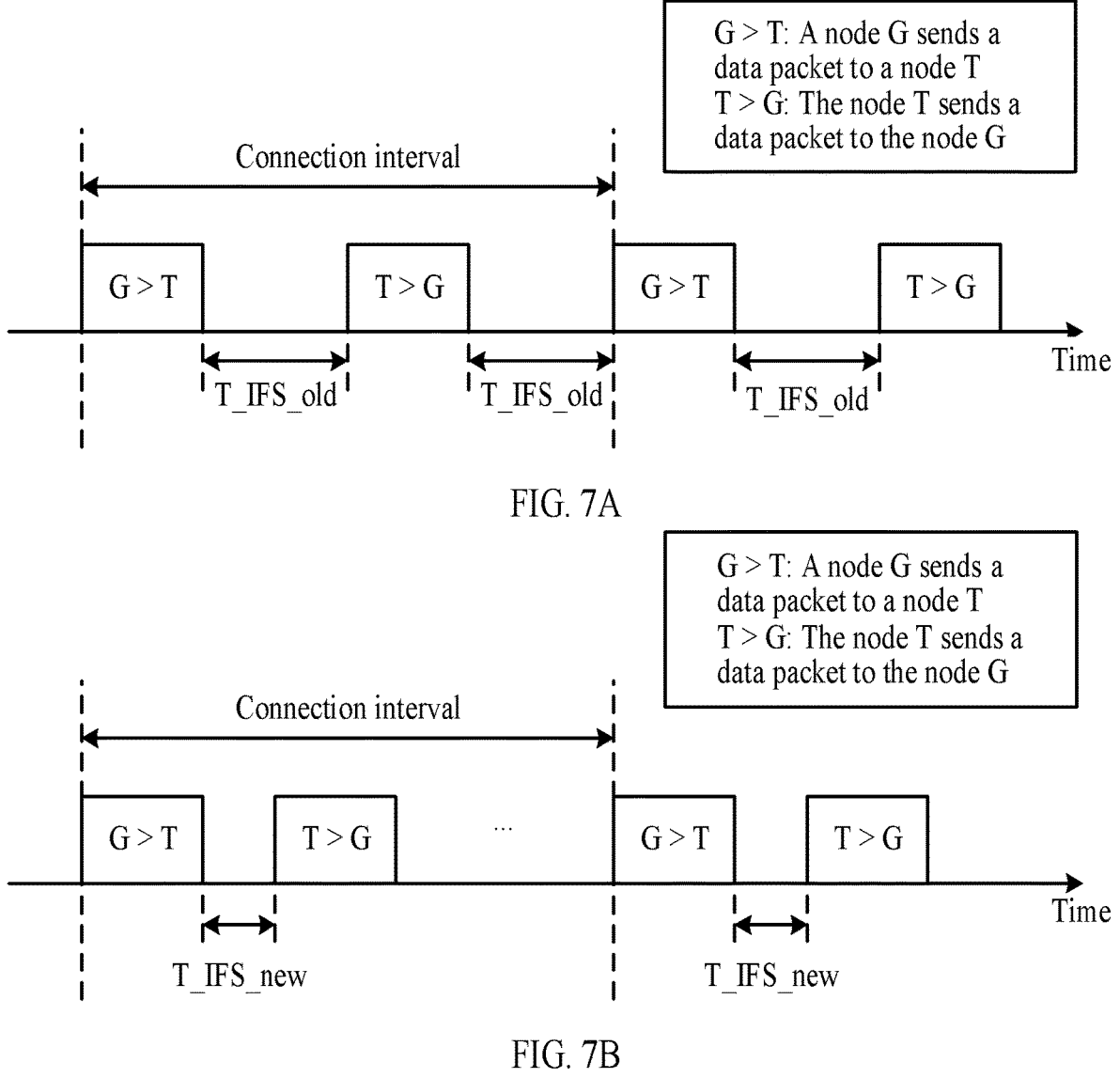
FIG. 7A is a schematic diagram of comparison of receiving/sending switching control effects in an asynchronous bidirectional link according to an embodiment.
FIG. 7B is a schematic diagram of comparison of receiving/sending switching control effects in a synchronous bidirectional link according to an embodiment.

For example, FIGS. 7A and 7B illustrate a comparison of receiving/sending switching control effects in an asynchronous bidirectional link according to an embodiment of this disclosure. As shown in FIG. 7A, receiving/sending switching control in the asynchronous bidirectional link is used as an example. When the existing receiving/sending switching control method is used to perform control, a corresponding receiving/sending switching interval is fixed T_IFS_old shown in a diagram in FIG. 7A. When the receiving/sending switching interval is updated by using the method provided in the foregoing embodiment of this disclosure, the receiving/sending switching interval may be adjusted to a smaller value, and a corresponding receiving/sending switching interval is T_IFS_new shown in a diagram in FIG. 7B. Because T_IFS_new is less than T_IFS_old, more data packets can be received and sent in one connection period (connection interval). This improves a throughput rate of service processing. Alternatively, when a quantity of data packets received and sent in one connection period is fixed, a value of the connection period can be reduced. This saves air interface resources.

Figures 7C, 7D:
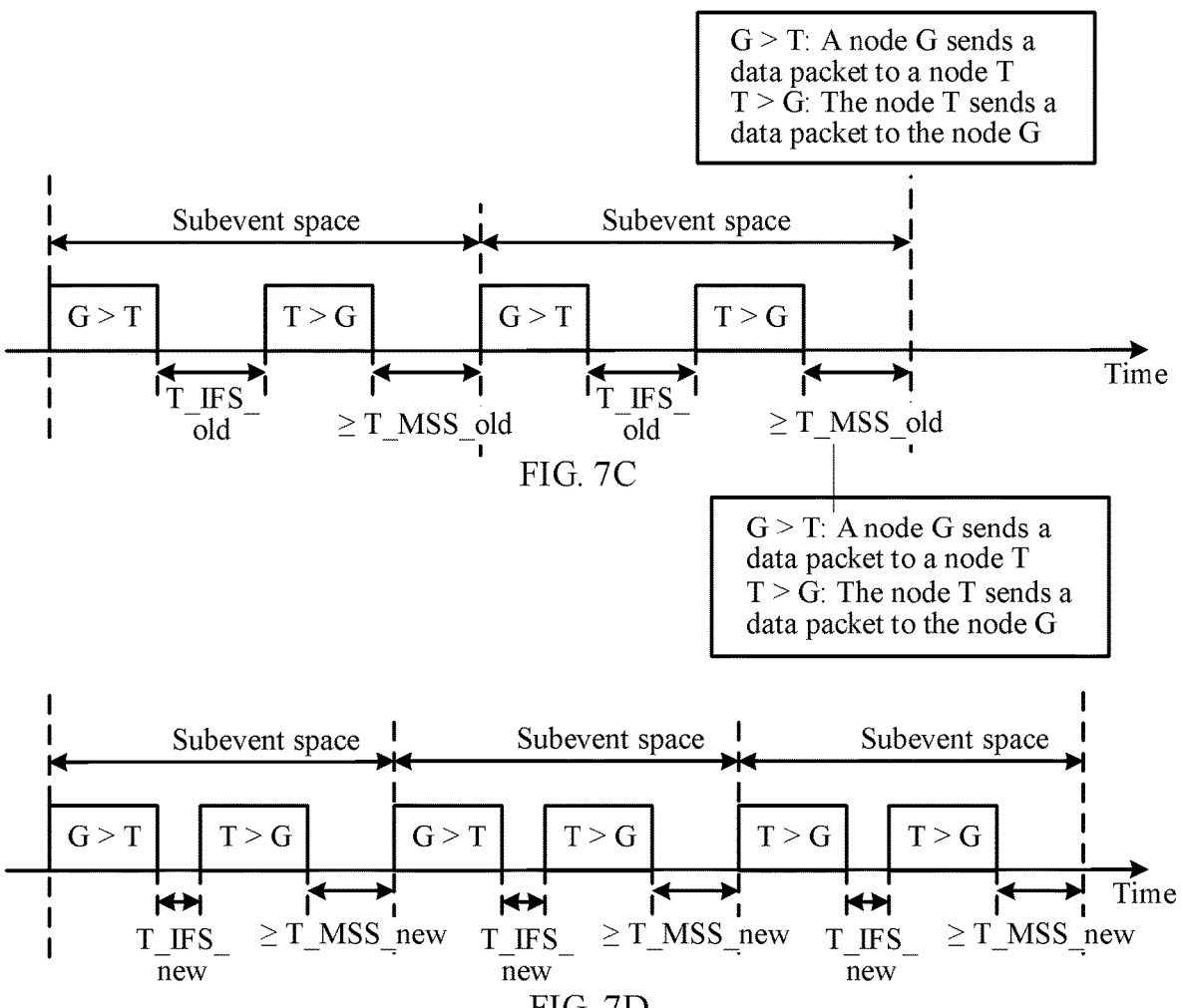
FIG. 7C is a schematic diagram of comparison of receiving/sending switching control effects in an asynchronous bidirectional link according to an embodiment.
FIG. 7D is a schematic diagram of comparison of receiving/sending switching control effects in a synchronous bidirectional link according to an embodiment.

For example, FIGS. 7C and 7D illustrate a comparison of receiving/sending switching control effects in a synchronous bidirectional link according to an embodiment of this disclosure. As shown in FIG. 7C, receiving/sending switching control in the synchronous bidirectional link is used as an example. When the existing receiving/sending switching control method is used to perform control, corresponding receiving/sending switching intervals are fixed T_IFS_old and T_MSS_old shown in a diagram in FIG. 7C. When the receiving/sending switching intervals are updated by using the method provided in the foregoing embodiment of this disclosure, the receiving/sending switching intervals may be adjusted to smaller values, and corresponding receiving/sending switching intervals are T_IFS_new and T_MSS_new shown in a diagram in FIG. 7D. Because T_IFS_new is less than T_IFS_old, and T_MSS_new is less than T_MSS_old, more subevents can be deployed in one connection period. This improves a throughput rate of service processing. Alternatively, when a quantity of data packets received and sent in one connection period is fixed, a value of a subevent period can be reduced. This saves air interface resources.

It should be noted that, in the foregoing embodiment, the receiving/sending switching interval updated by the main control node G and the terminal node T through signaling exchange is only used to control receiving/sending switching in the communication process between the main control node G and the terminal node T. A receiving/sending switching interval based on which receiving/sending switching control is performed in a communication process between the main control node G and another terminal node is determined through negotiation by the main control node G and the another terminal node.

It should be further noted that either of the two communication apparatuses that perform communication may be used as an apparatus for initiating update of a receiving/sending switching parameter, and the other communication apparatus may be used as an apparatus for accepting the update of the receiving/sending parameter. For example, in the foregoing embodiment, an example in which the main control node G is used as a node for initiating the update of the receiving/sending switching interval is used for description. Alternatively, the terminal node T may initiate a process of requesting the update of the receiving/sending switching interval, and the main control node G may accept the request initiated by the terminal node T.

In addition, the receiving/sending switching control method provided in the foregoing embodiment may be applied to a system including a plurality of communication apparatuses, for example, may be applied to the system including the main control node device and the plurality of terminal node devices in FIG. 2. Any two communication apparatuses that perform communication in the system may perform receiving/sending switching control according to the method provided in the foregoing embodiment, so that fixedly reserved slots for receiving/sending switching can be reduced, and retransmission opportunities of service data can be increased. This improves system reliability, enables more users to access the system, and improves a capability of concurrent processing of a plurality of services in the system. In addition, the communication apparatus may optimize the receiving/sending switching interval for a service scenario, to improve flexibility of the receiving/sending switching control and improve the throughput rate. The receiving/sending switching control method provided in this embodiment of this disclosure can further support compatibility between different devices and different application scenarios, and is conducive to evolution and development of subsequent conventional technologies.

In the foregoing embodiments provided in this disclosure, the receiving/sending switching control method provided in embodiments of this disclosure is described from a perspective of the management node and the terminal node that are used as execution bodies. To implement functions in the method provided in embodiments of this disclosure, the management node and the terminal node may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 8:
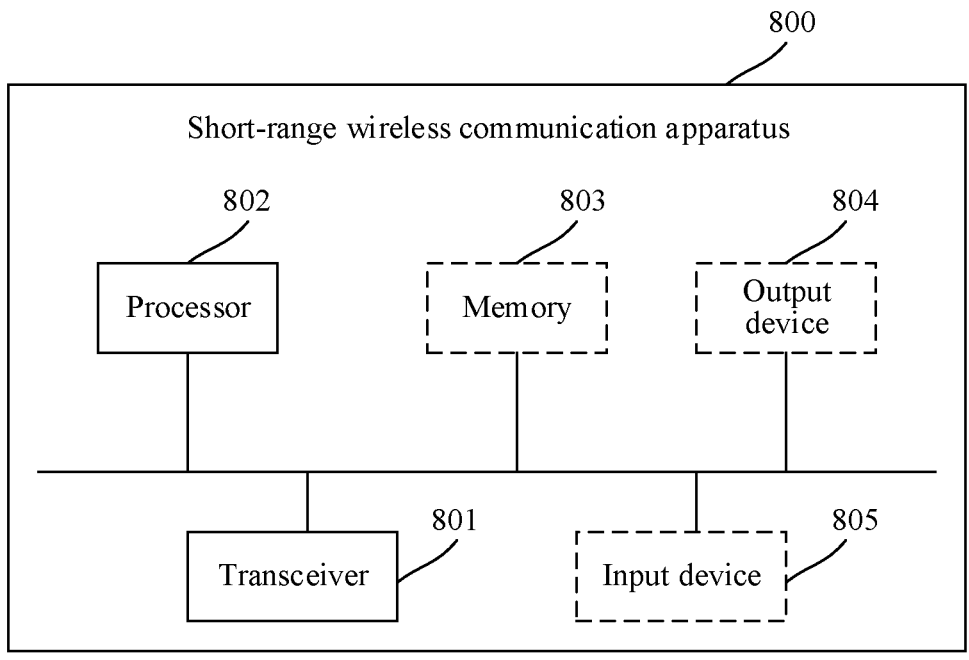
FIG. 8 is a schematic diagram of a structure of a short-range wireless communication apparatus according to an embodiment.

Based on the foregoing embodiments and a same concept, an embodiment of this disclosure further provides a short-range wireless communication apparatus, configured to implement a function of the management node or the terminal node provided in embodiments of this disclosure. FIG. 8 shows a short-range wireless communication apparatus 800 according to an embodiment of this disclosure. The short-range wireless communication apparatus 800 may be a terminal device, or may be a chip or a chip system in a terminal device.

In some embodiments of this disclosure, the short-range wireless communication apparatus 800 may alternatively be a structure such as a network device, an electronic device, a chip, or an integrated circuit that can perform the receiving/sending switching control method provided in embodiments of this disclosure.

For example, the short-range wireless communication apparatus 800 includes a transceiver 801 and at least one processor 802. The processor 802 and the transceiver 801 are coupled to each other. In this embodiment of this disclosure, the coupling is an indirect coupling or a communication connection between apparatuses, units, or modules, may be in an electrical, mechanical, or another form, and is used for information exchange between the apparatuses, units, or modules.

Specifically, the transceiver 801 may be a circuit, a bus, a communication interface, or any other module that may be configured to perform information exchange, and may be configured to receive or send information.

Optionally, the communication apparatus 800 may further include a memory 803. The memory 803 is coupled to the transceiver 801 and the processor 802, and is configured to store program instructions.

The processor 802 is configured to invoke program instructions stored in the memory 803, so that the short-range wireless communication apparatus 800 performs the method performed by the management node or the terminal node in the receiving/sending switching control method provided in embodiments of this disclosure.

The transceiver 801 is configured to receive and send a radio frequency signal, and is coupled to a receiver and a transmitter of the short-range wireless communication apparatus 800. The transceiver 801 communicates with another short-range wireless communication device by using a radio frequency signal and a communication network, for example, a wireless local area network (WLAN), a BLUETOOTH communication network, or the like. In specific implementation, a communication protocol supported by the transceiver 801 includes at least a BLUETOOTH protocol.

During specific implementation, the memory 803 may include a high-speed random access memory, and may also include a nonvolatile memory, for example, one or more magnetic disk storage devices, a flash device, or another nonvolatile solid-state storage device. The memory 803 may store an operating system (referred to as a system below), for example, an embedded operating system such as ANDROID, iOS, WINDOWS, LINUX, or the like. The memory 803 may be configured to store an implementation program in this embodiment of this disclosure. The memory 803 may further store a network communication program. The network communication program may be used to communicate with one or more additional devices, one or more user equipment, or one or more network devices.

The processor 802 may be a general-purpose central processing unit (CPU), a microprocessor, an application-specific integrated circuit (ASIC), or one or more integrated circuits configured to control execution of programs of the solutions of this disclosure.

In some embodiments, the short-range wireless communication apparatus 800 may further include an output device 804 and an input device 805. The output device 804 communicates with the processor 802, and may display information in a plurality of manners. For example, the output device 804 may be a liquid-crystal display (LCD), a light-emitting diode (LED) display device, a cathode-ray tube (CRT) display device, a projector, or the like. The input device 805 communicates with the processor 802, and may receive a user input in a plurality of manners. For example, the input device 805 may be a mouse, a keyboard, a touchscreen device, or a sensor device. For ease of user use of the output device 804 and the input device 805, in some embodiments, the memory 803 may further store a user interface program. The user interface program may vividly display content of an application program through a graphical operating interface, and receive a control operation of a user on the application program by using an input control, for example, a menu, a dialog box, or a key.

In an example, when the short-range wireless communication apparatus 800 is implemented as the management node in the foregoing embodiments, the transceiver 801 is configured to send, to the terminal node, a negotiation request used to update a receiving/sending switching interval to first switching time, where the receiving/sending switching interval includes a first receiving/sending switching interval of the management node and a second receiving/sending switching interval of the terminal node, and receive acknowledgment response information fed back by the terminal node in response to the negotiation request. The processor 802 is configured to update the first receiving/sending switching interval of the management node to the first switching time based on the acknowledgment response information.

In a possible design, when updating the first receiving/sending switching interval of the management node to the first switching time based on the acknowledgment response information, the processor 802 is configured to send indication information to the terminal node by using the transceiver 801, where the indication information indicates an effective time for updating the receiving/sending switching interval, and update the first receiving/sending switching interval to the first switching time after the effective time.

In a possible design, when updating the first receiving/sending switching interval of the management node to the first switching time based on the acknowledgment response information, the processor 802 is configured to send acknowledgment information to the terminal node by using the transceiver 801, to indicate the terminal node to update the second receiving/sending switching interval of the terminal node to the first switching time, and update the first receiving/sending switching interval to the first switching time.

In a possible design, after the processor 802 sends the acknowledgment information to the terminal node by using the transceiver 801, and before the processor updates the first receiving/sending switching interval to the first switching time, the processor 802 is further configured to monitor and receive, by using the transceiver 801, a first data packet from the terminal node in a specified receiving window after target switching time, where a value of the target switching time is a value of the smaller one of the first receiving/sending switching interval that is not updated and the first switching time, and determine, based on a receiving moment of the first data packet, that the terminal node receives the acknowledgment information.

In a possible design, when determining, based on the receiving moment of the first data packet, that the terminal node receives the acknowledgment information, the processor 802 is configured to, when determining that the receiving moment is consistent with a target receiving moment, determine that the terminal node receives the acknowledgment information. The target receiving moment is a receiving moment that is calculated by the management node and that corresponds to the first data packet when the first receiving/sending switching interval is the first switching time.

In a possible design, a size of the specified receiving window is greater than or equal to a sum of a first target value and a second target value, a value of the first target value is a size value of a corresponding receiving window in which the management node monitors a second data packet from the terminal node before the management node updates the first receiving/sending switching interval to the first switching time, and a value of the second target value is a value of a difference between the first receiving/sending switching interval that is not updated and an updated first receiving/sending switching interval.

In a possible design, any receiving/sending switching interval includes at least one of an intra-frame space and a minimum subevent space.

In another example, when the short-range wireless communication apparatus 800 is implemented as the terminal node in the foregoing embodiments, the transceiver 801 is configured to receive a negotiation request that is sent by a management node and that is used to update a receiving/sending switching interval to first switching time. The receiving/sending switching interval includes a first receiving/sending switching interval of the management node and a second receiving/sending switching interval of the terminal node. The processor 802 is configured to update the second receiving/sending switching interval of the terminal node to the first switching time in response to the negotiation request.

In a possible design, when updating the second receiving/sending switching interval of the terminal node to the first switching time in response to the negotiation request, the processor 802 is configured to feed back acknowledgment response information to the management node by using the transceiver 801 in response to the negotiation request, receive, by using the transceiver 801, indication information delivered by the management node in response to the acknowledgment response information, where the indication information indicates an effective time for updating the receiving/sending switching interval, and update the second receiving/sending switching interval to the first switching time after the effective time.

In a possible design, when updating the second receiving/sending switching interval of the terminal node to the first switching time in response to the negotiation request, the processor 802 is configured to feed back acknowledgment response information to the management node by using the transceiver 801 in response to the negotiation request, receive, by using the transceiver 801, acknowledgment information delivered by the management node in response to the acknowledgment response information, where the acknowledgment information indicates the terminal node to update the second receiving/sending switching interval to the first switching time, and update the second receiving/sending switching interval to the first switching time.

In a possible design, any receiving/sending switching interval includes at least one of an intra-frame space and a minimum subevent space.

It should be noted that FIG. 8 is merely an implementation of this embodiment of this disclosure. In actual application, the short-range wireless communication apparatus 800 may further include more or fewer components. This is not limited herein.

Figure 9:
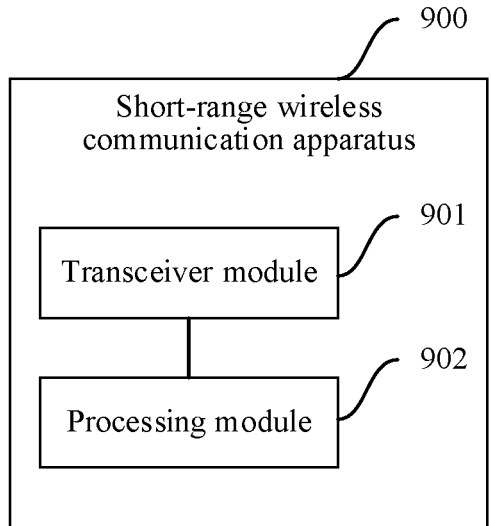
FIG. 9 is a schematic diagram of a structure of a short-range wireless communication apparatus according to an embodiment.

Based on the foregoing embodiments and a same concept, an embodiment of this disclosure further provides a short-range wireless communication apparatus, configured to implement a function of the management node or the terminal node provided in embodiments of this application. FIG. 9 shows a short-range wireless communication apparatus 900 according to this disclosure. The short-range wireless communication apparatus 900 may be a terminal device, or may be a chip or a chip system in a terminal device.

Specifically, the short-range wireless communication apparatus 900 includes a transceiver module 901 and a processing module 902. The transceiver module 901 is configured to receive data sent by an external communication apparatus and send data to the external communication apparatus.

When the short-range wireless communication apparatus 900 is implemented as the management node in the foregoing embodiments, the transceiver module 901 cooperates with the processing module 902, and may be configured to perform the method that is performed by the management node and that is provided in embodiments of this disclosure.

When the short-range wireless communication apparatus 900 is implemented as the terminal node in the foregoing embodiments, the transceiver module 901 cooperates with the processing module 902, and may be configured to perform the method that is performed by the terminal node and that is provided in embodiments of this disclosure.

Division into the modules in embodiments of this disclosure is an example, is merely division into logical functions, and may be other division during actual implementation. In addition, functional modules in embodiments of this disclosure may be integrated into one processor, or may exist alone physically, or two or more modules may be integrated into one module. The integrated module may be implemented in a form of hardware, or may be implemented in a form of a software functional module.

Based on the foregoing embodiments and a same concept, an embodiment of this disclosure further provides a communication system. The communication system includes at least the management node and the terminal node provided in the foregoing embodiments.

Based on the foregoing embodiments and a same concept, an embodiment of this disclosure further provides a computer storage medium. The computer storage medium stores a computer-readable program. When the computer readable program is run on a computer, the computer is enabled to perform the receiving/sending switching control method provided in the foregoing embodiments.

Based on the foregoing embodiments and a same concept, an embodiment of this disclosure further provides a computer program product. When the computer program product runs on a computer, the computer is enabled to perform the receiving/sending switching control method provided in the foregoing embodiments.

Based on the foregoing embodiments and a same concept, an embodiment of this disclosure further provides a chip. The chip is configured to read a computer program stored in a memory, to perform the receiving/sending switching control method provided in the foregoing embodiments.

Based on the foregoing embodiments and a same concept, an embodiment of this disclosure further provides a chip system. The chip system includes a processor, configured to support a computer apparatus to implement the receiving/sending switching control method provided in the foregoing embodiments.

In a possible design, the chip system further includes a memory. The memory is configured to store a program and data that are necessary for the computer apparatus.

In a possible design, the chip system includes a chip, or includes a chip and another discrete device.

It is clear that, a person skilled in the art can make various modifications and variations without departing from the scope of this disclosure. In this way, this disclosure is intended to cover these modifications and variations provided that they fall within the scope of the claims of this disclosure and their equivalent technologies.

What is claimed is:

1. A method, comprising:
    sending, by a management node to a terminal node, a negotiation request to update a receiving/sending switching interval to a first switching time, wherein the receiving/sending switching interval comprises a first receiving/sending switching interval of the management node and a second receiving/sending switching interval of the terminal node;

receiving, by the management node, acknowledgment response information from the terminal node in response to the negotiation request; and
    updating, by the management node, the first receiving/sending switching interval to the first switching time based on the acknowledgment response information.

2. The method of claim 1, wherein updating, by the management node, the first receiving/sending switching interval of the management node to the first switching time based on the acknowledgment response information comprises:
    sending, by the management node, indication information to the terminal node, wherein the indication information indicates an effective time for updating the receiving/sending switching interval; and
    updating, by the management node, after the effective time, the first receiving/sending switching interval to the first switching time.

3. The method of claim 1, wherein updating, by the management node, the first receiving/sending switching interval to the first switching time based on the acknowledgment response information comprises:
    sending, by the management node, acknowledgment information to the terminal node to instruct the terminal node to update the second receiving/sending switching interval of the terminal node to the first switching time; and
    updating, by the management node, the first receiving/sending switching interval to the first switching time.

4. The method of claim 3, wherein after sending, by the management node, acknowledgment information to the terminal node, and before updating, by the management node, the first receiving/sending switching interval to the first switching time, the method further comprises:
    monitoring and receiving, by the management node, a first data packet from the terminal node in a specified receiving window after a target switching time, wherein a value of the target switching time is the smaller of the first receiving/sending switching interval that is not updated and the first switching time; and
    determining, by the management node, based on a receiving moment of the first data packet, that the terminal node has received the acknowledgment information.

5. The method of claim 4, wherein determining, by the management node, based on a receiving moment of the first data packet, that the terminal node has received the acknowledgment information comprises determining that the receiving moment is consistent with a target receiving moment, wherein the target receiving moment is a receiving moment corresponding to the first data packet when the first receiving/sending switching interval is the first switching time.

6. The method of claim 4, wherein a size of the specified receiving window is greater than or equal to a sum of a first target value and a second target value, wherein the first target value is a size value of a corresponding receiving window in which the management node monitors a second data packet from the terminal node before the management node updates the first receiving/sending switching interval to the first switching time, and wherein the second target value is a difference between the first receiving/sending switching interval that is not updated and an updated first receiving/sending switching interval.

7. The method of claim 1, wherein the receiving/sending switching interval and the second receiving/sending switching interval comprise at least one of an intra-frame space or a minimum subevent space.

8. The method of claim 1, wherein the management node repeats each of the sending, receiving and updating steps N times for N terminal nodes, wherein N is an integer greater than one.

9. A receiving/sending switching control method, comprising:

receiving, by a terminal node, a negotiation request from a management node to update a receiving/sending switching interval to a first switching time, wherein the receiving/sending switching interval comprises a first receiving/sending switching interval of the management node and a second receiving/sending switching interval of the terminal node; and updating, by the terminal node in response to the negotiation request, the second receiving/sending switching interval to the first switching time.

10. The method of claim 9, wherein updating, by the terminal node, the second receiving/sending switching interval of the terminal node to the first switching time comprises:

feeding back, by the terminal node in response to the negotiation request, acknowledgment response information to the management node;

receiving, by the terminal node in response to the acknowledgment response information, indication information from the management node, wherein the indication information indicates an effective time for updating the receiving/sending switching interval; and updating, by the terminal node after the effective time, the second receiving/sending switching interval to the first switching time.

11. The method of claim 9, wherein the receiving/sending switching interval and the second receiving/sending switching interval comprise at least one of an intra-frame space or a minimum subevent space.

12. The method of claim 9, wherein updating, by the terminal node in response to the negotiation request, the second receiving/sending switching interval of the terminal node to the first switching time comprises:

feeding back, by the terminal node in response to the negotiation request, acknowledgment response information to the management node; and receiving, by the terminal node in response to the acknowledgment response information, acknowledgment information from the management node, wherein the acknowledgment information instructs the terminal node to update the second receiving/sending switching interval to the first switching time.

13. A terminal node, comprising:

a transceiver configured to receive a negotiation request from a management node and that is used to update a receiving/sending switching interval to a first switching time, wherein the receiving/sending switching interval comprises a first receiving/sending switching interval of the management node and a second receiving/sending switching interval of the terminal node; and one or more processors coupled with the transceiver and configured to update the second receiving/sending switching interval of the terminal node to the first switching time in response to the negotiation request.

14. The terminal node of claim 13, wherein when updating the second receiving/sending switching interval of the terminal node to the first switching time in response to the negotiation request, the one or more processors are further configured to:

feed back, by using the transceiver, in response to the negotiation request, acknowledgment response information to the management node;

receive, by using the transceiver, indication information from the management node in response to the acknowledgment response information, wherein the indication information indicates an effective time for updating the receiving/sending switching interval; and update, after the effective time, the second receiving/sending switching interval to the first switching time.

15. The terminal node of claim 13, wherein when updating the second receiving/sending switching interval of the terminal node to the first switching time in response to the negotiation request, the one or more processors are further configured to:

feed back, by using the transceiver, in response to the negotiation request, acknowledgment response information to the management node; and receive, by using the transceiver, acknowledgment information from the management node in response to the acknowledgment response information, wherein the acknowledgment information instructs the terminal node to update the second receiving/sending switching interval to the first switching time.

16. The terminal node of claim 13, wherein the receiving/sending switching interval comprises at least one of an intra-frame space or a minimum subevent space.

17. The terminal node of claim 13, wherein the transceiver and the one or more processors are implemented on a single chip.

18. The terminal node of claim 13, wherein the terminal node comprises a headset.

19. The terminal node of claim 13, wherein the terminal node comprises a display screen.

20. The terminal node of claim 13, wherein the terminal node comprises a tablet device.

* * * * *